US010755391B2

(12) United States Patent
Lin et al.

(10) Patent No.: US 10,755,391 B2
(45) Date of Patent: Aug. 25, 2020

(54) DIGITAL IMAGE COMPLETION BY LEARNING GENERATION AND PATCH MATCHING JOINTLY

(71) Applicant: Adobe Inc., San Jose, CA (US)

(72) Inventors: Zhe Lin, Fremont, CA (US); Xin Lu, Mountain View, CA (US); Xiaohui Shen, San Jose, CA (US); Jimei Yang, Mountain View, CA (US); Jiahui Yu, Champaign, IL (US)

(73) Assignee: Adobe Inc., San Jose, CA (US)

( * ) Notice: Subject to any disclaimer, the term of this patent is extended or adjusted under 35 U.S.C. 154(b) by 71 days.

(21) Appl. No.: 15/980,691

(22) Filed: May 15, 2018

(65) Prior Publication Data

US 2019/0355102 A1    Nov. 21, 2019

(51) Int. Cl.
*G06K 9/62* (2006.01)
*G06T 5/00* (2006.01)

(52) U.S. Cl.
CPC ............ *G06T 5/005* (2013.01); *G06K 9/6202* (2013.01); *G06T 2207/20081* (2013.01)

(58) Field of Classification Search
None
See application file for complete search history.

(56) References Cited

U.S. PATENT DOCUMENTS

| 6,160,923 | A  | 12/2000 | Lawton et al. |
| 8,233,739 | B1 | 7/2012  | Cho et al. |
| 8,249,365 | B1 | 8/2012  | Winnemoeller et al. |
| 8,340,463 | B1 | 12/2012 | Cho et al. |
| 8,670,630 | B1 | 3/2014  | Kwatra |
| 9,208,548 | B1 | 12/2015 | Noble et al. |
| 9,552,626 | B1 | 1/2017  | Filra |
| 9,697,234 | B1 | 7/2017  | Dhua et al. |

(Continued)

FOREIGN PATENT DOCUMENTS

GB    2255699    11/1992

OTHER PUBLICATIONS

"Pre-Interview First Office Action", U.S. Appl. No. 15/679,602, dated Jun. 20, 2018, 4 pages.

(Continued)

*Primary Examiner* — Iman K Kholdebarin
(74) *Attorney, Agent, or Firm* — SBMC

(57) ABSTRACT

Digital image completion by learning generation and patch matching jointly is described. Initially, a digital image having at least one hole is received. This holey digital image is provided as input to an image completer formed with a dual-stage framework that combines a coarse image neural network and an image refinement network. The coarse image neural network generates a coarse prediction of imagery for filling the holes of the holey digital image. The image refinement network receives the coarse prediction as input, refines the coarse prediction, and outputs a filled digital image having refined imagery that fills these holes. The image refinement network generates refined imagery using a patch matching technique, which includes leveraging information corresponding to patches of known pixels for filtering patches generated based on the coarse prediction. Based on this, the image completer outputs the filled digital image with the refined imagery.

20 Claims, 9 Drawing Sheets

(56) References Cited

U.S. PATENT DOCUMENTS

| | | | |
|---|---|---|---|
| 9,922,425 | B2 | 3/2018 | Partis et al. |
| 10,134,108 | B2 | 11/2018 | Amirghodsi et al. |
| 10,198,839 | B2 * | 2/2019 | Rymkowski ............ G06T 11/60 |
| 10,282,877 | B2 | 5/2019 | Bedi et al. |
| 10,614,557 | B2 | 4/2020 | Lin et al. |
| 10,672,164 | B2 | 6/2020 | Lin et al. |
| 10,699,453 | B2 | 6/2020 | Jin et al. |
| 2006/0104542 | A1 | 5/2006 | Blake et al. |
| 2012/0141045 | A1 * | 6/2012 | Bae ......................... G06T 5/005 382/275 |
| 2013/0051685 | A1 | 2/2013 | Shechtman et al. |
| 2013/0266208 | A1 | 10/2013 | Lim et al. |
| 2014/0201126 | A1 | 7/2014 | Zadeh et al. |
| 2014/0254882 | A1 | 9/2014 | Jin |
| 2015/0036945 | A1 | 2/2015 | Zullani |
| 2016/0027159 | A1 | 1/2016 | Amirghodsi et al. |
| 2017/0140514 | A1 | 5/2017 | Amirghodsi et al. |
| 2017/0178325 | A1 | 6/2017 | Ye et al. |
| 2017/0278289 | A1 * | 9/2017 | Marino ............. G06K 9/00765 |
| 2017/0372193 | A1 * | 12/2017 | Mailhe ................. G06N 3/0472 |
| 2018/0082715 | A1 | 3/2018 | Rymkowski et al. |
| 2018/0096454 | A1 | 4/2018 | Amirghodsi et al. |
| 2018/0107896 | A1 | 4/2018 | Sagong |
| 2018/0121754 | A1 | 5/2018 | Carr et al. |
| 2018/0150940 | A1 | 5/2018 | Reinhard et al. |
| 2018/0165798 | A1 | 6/2018 | Lin et al. |
| 2018/0174276 | A1 | 6/2018 | Michel et al. |
| 2018/0211380 | A1 * | 7/2018 | Tandon ................. G06T 7/0012 |
| 2018/0322662 | A1 | 11/2018 | Hellier et al. |
| 2018/0350030 | A1 | 12/2018 | Simons et al. |
| 2019/0043242 | A1 | 2/2019 | Risser |
| 2019/0057527 | A1 | 2/2019 | Jin et al. |
| 2019/0066268 | A1 * | 2/2019 | Song ..................... G06N 3/0454 |
| 2019/0066733 | A1 | 2/2019 | Somanath et al. |
| 2019/0073792 | A1 | 3/2019 | Fletcher et al. |
| 2019/0095730 | A1 * | 3/2019 | Fu ........................ G06N 3/0445 |
| 2019/0114511 | A1 * | 4/2019 | Gao ........................ G06N 3/084 |
| 2019/0114748 | A1 | 4/2019 | Lin et al. |
| 2019/0114818 | A1 * | 4/2019 | Lin .......................... G06T 5/005 |
| 2019/0347772 | A1 * | 11/2019 | Zhang .................... A61B 5/055 |
| 2020/0184610 | A1 | 6/2020 | Lin et al. |
| 2020/0202601 | A1 | 6/2020 | Lin et al. |

OTHER PUBLICATIONS

Lu,"Deep Multi-Patch Aggregation Network for Image Style, Aesthetics, and Quality Estimation", In Proceedings of the IEEE International Conference on Computer Vision, Dec. 2015, 9 pages.
"Non-Final Office Action", U.S. Appl. No. 15/679,602, dated Sep. 30, 2019, 9 pages.
"Pre-Interview First Office Action", U.S. Appl. No. 15/785,359, dated Sep. 18, 2019, 4 pages.
"Restriction Requirement", U.S. Appl. No. 15/785,359, dated Jul. 5, 2019, 6 pages.
"Final Office Action", U.S. Appl. No. 15/679,602, dated Feb. 13, 2019, 25 pages.
Michel,"Completing an Image", EP Application No. 16306754.9, filed on Dec. 21, 2016, 21 pages.
"Combined Search and Examination Report", GB Application No. 1813278.7, dated Feb. 18, 2019, 5 pages.
"Combined Search and Examination Report", GB Application No. 1813319.9, dated Feb. 15, 2019, 6 pages.
"First Action Interview Office Action", U.S. Appl. No. 15/679,602, dated Sep. 28, 2018, 5 pages.
Achanta,"SLIC Superpixels Compared to State-of-the-Art Superpixel Methods", IEEE Transactions on Pattern Analysis and Machine Intelligence, vol. 34, No. 11, Nov. 2012, pp. 2274-2281.
Arjovsky,"Wasserstein GAN", Mar. 9, 2017, 32 pages.
Ballester,"Filling-In by Joint Interpolation of Vector Fields and Gray Levels", IEEE transactions on image processing, Apr. 2, 2001, 30 pages.
Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.
Bertalmio,"Image Inpainting", SIGGRAPH '00: Proceedings of the 2nd annual conference on computer graphics and interactive techniques, ACM Press/Addison-Wesley Publishing Co., New York, NY, USA, Jul. 2000, 8 pages.
Chen,"Fast Patch-based Style Transfer of Arbitrary Style", Dec. 13, 2016, 10 pages.
Cimpoi,"Describing Textures in the Wild", In Proceedings of the IEEE Conference on Computer Vision and Pattern Recognition, Nov. 15, 2013, 13 pages.
Clevert,"Fast and Accurate Deep Network Learning by Exponential Linear Units (ELUs)", ICLR 2016, Feb. 22, 2016, 14 pages.
Dai,"Deformable Convolutional Networks", Jun. 5, 2017, 12 pages.
Darabi,"Image Melding: Combining Inconsistent Images using Patch-based Synthesis", ACM Transactions on Graphics 31, 4, 82, Aug. 2012, 10 pages.
Efros,"Image Quilting for Texture Synthesis and Transfer", SIGGRAPH 2001, Computer Graphics Proceedings, ACM Press/ACM SIGGRAPH, E. Fiume, Ed., Aug. 2001, 6 pages.
Efros,"Texture Synthesis by Non-parametric Sampling", In: IEEE International Conference on Computer Vision. (1999), Sep. 1999, 6 pages.
Farbman,"Convolution Pyramids", ACM Trans. Graph. 30, 6, Nov. 2012, 9 pages.
Gatys,"Image Style Transfer Using Convolutional Neural Networks", In Proc. CVPR, 2016., Jun. 2016, pp. 2414-2423.
Gatys,"Preserving Color in Neural Artistic Style Transfer", https://arxiv.org/abs/1606.05897, Jun. 19, 2016, 8 pages.
Glasner,"Super-Resolution from a Single Image", Super-Resolution form a Single Image, Oct. 20, 2009, 8 pages.
Goodfellow,"Generative Adversarial Nets", Jun. 10, 2014, 9 pages.
Gulrajani,"Improved Training of Wasserstein GANs", Dec. 25, 2017, 20 pages.
Hays,"Scene Completion Using Millions of Photographs", ACM SIGGRAPH, vol. 26, 4:1-4, Jul. 2007, 8 pages.
He,"Deep Residual Learning for Image Recognition", Dec. 10, 2015, 12 pages.
He,"Statistics of Patch Offsets for Image Completion", ECCV 2012, Oct. 7, 2012, 14 pages.
Huang,"Image Completion using Planar Structure Guidance", Proceedings of ACM SIGGRAPH 2014, Jul. 2014, 10 pages.
Iizuka,"Globally and Locally Consistent Image Completion", ACM Transactions on Graphics (TOG) 36, Jul. 20, 2017, 13 pages.
Ioffe,"Batch Normalization: Accelerating Deep Network Training by Reducing Internal Covariate Shift", Mar. 2015, 11 pages.
Jaderberg,"Spatial Transformer Networks", Feb. 4, 2016, 14 pages.
Jeon,"Active Convolution: Learning the Shape of Convolution for Image Classification", May 27, 2017, 9 pages.
Johnson,"Perceptual Losses for Real-Time Style Transfer and Super-Resolution.", Mar. 27, 2016, 18 pages.
Karras,"Progressive Growing of GANs for Improved Quality, Stability, and Variation", Feb. 26, 2018, 26 pages.
Klose,"Sampling Based Scene-Space Video Processing", ACM Transactions on Graphics (TOG)—Proceedings of ACM SIGGRAPH 2015, Aug. 2015, 11 pages.
Kohler,"Mask-specific Inpainting with Deep Neural Networks", Oct. 15, 2014, 12 pages.
Kohli,"Robust Higher Order Potentials for Enforcing Label Consistency", Retrieved from <<http://research. microsoft.com/en-us/um/people/pkohli/papers/klt_ cvpr08. pdf>> on Jun. 19, 2009, Jan. 2009, 8 pages.
Kwatra,"Graphcut Textures: Image and Video Synthesis Using Graph Cuts", ACM Trans. Graph. 22 (2003), 3, Jul. 2003, 10 pages.
Lee,"Deeply-Supervised Nets", Sep. 25, 2014, 10 pages.
Levin,"Seamless Image Stitching in the Gradient Domain", Proceedings of the European Conference on Computer Vision, May 2004, pp. 377-389.
Li,"Combining Markov Random Fields and Convolutional Neural Networks for Image Synthesis", In Proceedings of the IEEE Conference on Computer Vision and Pattern Recognition, Jan. 18, 2016, 9 pages.

(56) References Cited

OTHER PUBLICATIONS

Li,"Generative Face Completion", Apr. 19, 2017, 9 pages.
Liu,"Deep Learning Face Attributes in the Wild", Jan. 24, 2015, 11 pages.
Liu,"Exemplar-based Image Inpainting using Multiscale Graph Cuts", IEEE Transactions on Image Processing—vol. 22, Issue: 5, 09/13/202, 13 pages.
Mao,"Least Squares Generative Adversarial Networks", Apr. 5, 2017, 16 pages.
Newson,"Video Inpainting of Complex Scenes", SIAM Journal of Imaging Science 7, 4, Mar. 18, 2015, 27 pages.
Nguyen,"Synthesizing the preferred inputs for neurons in neural networks via deep generator networks", Nov. 23, 2016, 29 pages.
Park,"Transformation-Grounded Image Generation Network for Novel 3D View Synthesis", Mar. 8, 2017, 17 pages.
Pathak,"Context Encoders: Feature Learning by Inpainting", CVPR 2016, Nov. 21, 2016, 12 pages.
Perez,"Poisson Image Editing", Proc. ACM SIGGRAPH 2003, Jul. 2003, 6 pages.
Radford,"Unsupervised Representation Learning with Deep Convolutional Generative Adversarial Networks", ICLR 2016, Jan. 7, 2016, 16 pages.
Rother,""GrabCut"—Interactive Foreground Extraction using Iterated Graph Cuts", ACM SIGGRAPH 2004, Aug. 2004, 6 pages.
Russakovsky,"ImageNet Large Scale Visual Recognition Challenge", Jan. 30, 2015, 43 pages.
Salimans,"Improved Techniques for Training GANs", In Advances in Neural Information Processing Systems, Jun. 10, 2016, 10 pages.
Simakov,"Summarizing Visual Data Using Bidirectional Similarity", In Proceedings of CVPR 2008, Jun. 23, 2008, 8 pages.
Snelgrove,"High-Resolution Multi-Scale Neural Texture Synthesis", In SIGGRAPH Asia 2017 Technical Briefs, Nov. 27, 2017, 4 pages.
Sutton,"Reinforcement Learning: An Introduction", The MIT Press Cambridge, Massachusetts, Mar. 1, 1998, 398 pages.
Wei,"Fast Texture Synthesis Using Tree-Structured Vector Quantization", Proceedings of SIGGRAPH 2000, May 2000, 10 pages.
Wilber,"BAM! The Behance Artistic Media Dataset for Recognition Beyond Photography", Computer Vision and Pattern Recognition (cs.CV), Apr. 27, 2017, 10 pages.
Xu,"Deep Convolutional Neural Network for Image Deconvolution", In Advances in Neural Information Processing Systems, Dec. 8, 2014, 9 pages.
Yang,"High-Resolution Image Inpainting using Multi-Scale Neural Patch Synthesis", Apr. 13, 2017, 9 pages.
Yeh,"Semantic Image Inpainting with Deep Generative Models", Jul. 13, 2017, 19 pages.
Yu,"Multi-Scale Context Aggregation by Dilated Convolutions", Computer Vision and Pattern Recognition, Apr. 2016, 13 pages.
Zhou,"Places: A 10 million Image Database for Scene Recognition", Jul. 4, 2017, 14 pages.
"Corrected Notice of Allowability", U.S. Appl. No. 15/785,359, dated Jan. 16, 2020, 3 pages.
"Pre-Interview First Office Action", U.S. Appl. No. 15/785,386, dated Dec. 5, 2019, 5 pages.
"Notice of Allowance", U.S. Appl. No. 15/785,386, dated Feb. 6, 2020, 8 pages.
"Notice of Allowance", U.S. Appl. No. 15/785,359, dated Nov. 6, 2019, 9 pages.
"Corrected Notice of Allowability", U.S. Appl. No. 15/785,386, dated Apr. 22, 2020, 2 pages.
"Corrected Notice of Allowability", U.S. Appl. No. 15/785,359, dated Mar. 10, 2020, 3 pages.
"Corrected Notice of Allowability", U.S. Appl. No. 15/679,602, dated Jun. 4, 2020, 3 pages.
"Notice of Allowance", U.S. Appl. No. 15/679,602, dated Mar. 10, 2020, 9 pages.

* cited by examiner

DIGITAL IMAGE COMPLETION BY LEARNING GENERATION AND PATCH MATCHING JOINTLY

BACKGROUND

Content creation systems continue to make advances in computing technologies to enhance digital images in various ways largely limited to professional photographers in the past. With these advances, content creation systems are able to generate professional quality digital images from digital images captured by device users with little to no experience or knowledge of rules for composing visually pleasing images, e.g., the rule of thirds. By way of example, content creation systems can analyze a digital image and, based on the analysis, select post-processing operations, such as cropping, zooming, filtering, and so on, to perform on the digital image. In some cases, these content creation systems remove depicted imagery (e.g., blemishes, profanity, obscuring objects, and so on) of the digital images. This removal is effective to introduce holes into a digital image. Due to this, advances in computing technologies have also been made to enable content creation systems to generate content to fill these holes.

Conventional techniques for filling such holes take a holey digital image and a mask indicative of the holes as input, and output a completed image, i.e., an image having the holes filled. However, these conventional techniques are implemented using systems that fail to produce boundary consistent, semantically reasonable, and visually pleasant digital content for filling the holes. By way of example, these conventionally configured systems generate content that includes artifacts near a boundary of the hole. These conventionally configured systems also generate hole-filling content that fails to match remaining imagery of the holey image. Due to this matching failure, these conventionally configured systems also perform post-processing operations to match the generated hole-filling imagery to the remaining imagery of the holey image, e.g., Poisson image blending. Conventionally configured image completion systems also fail to fill holes proximate image borders and arbitrarily shaped holes. Consequently, conventional image completion systems result in digital images that are not photo-realistic. These systems also impose a burden on computing resources because the hole-filling content output by them must be post-processed to be suitably incorporated with the holey digital image.

SUMMARY

To overcome these problems, digital image completion by learning generation and patch matching jointly is leveraged in a digital medium environment. Initially, a holey digital image is received that includes at least one hole—a set of contiguous pixels having a set of values indicating an absence of depicted content. This holey digital image is provided as input to an image completer, which is formed to have a dual-stage framework that combines a coarse image neural network and an image refinement network. The coarse image neural network generates a coarse prediction of imagery for filling the holes of the holey digital image—this coarse prediction approximates a structure of content for filling the holes but includes less detail than the content that remains in the holey image. The image refinement network receives the coarse prediction as input, refines the coarse prediction, and outputs a filled digital image having refined imagery that fills the holes of the holey digital image. The image refinement network generates this refined imagery using a patch matching technique, which includes leveraging information corresponding to patches of known pixels for filtering patches that are generated based on the coarse prediction. Based on operation of this dual-stage framework, the image completer outputs, without post-processing operations, a filled digital image where holes are filled with boundary consistent, semantically reasonable, and visually pleasant digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
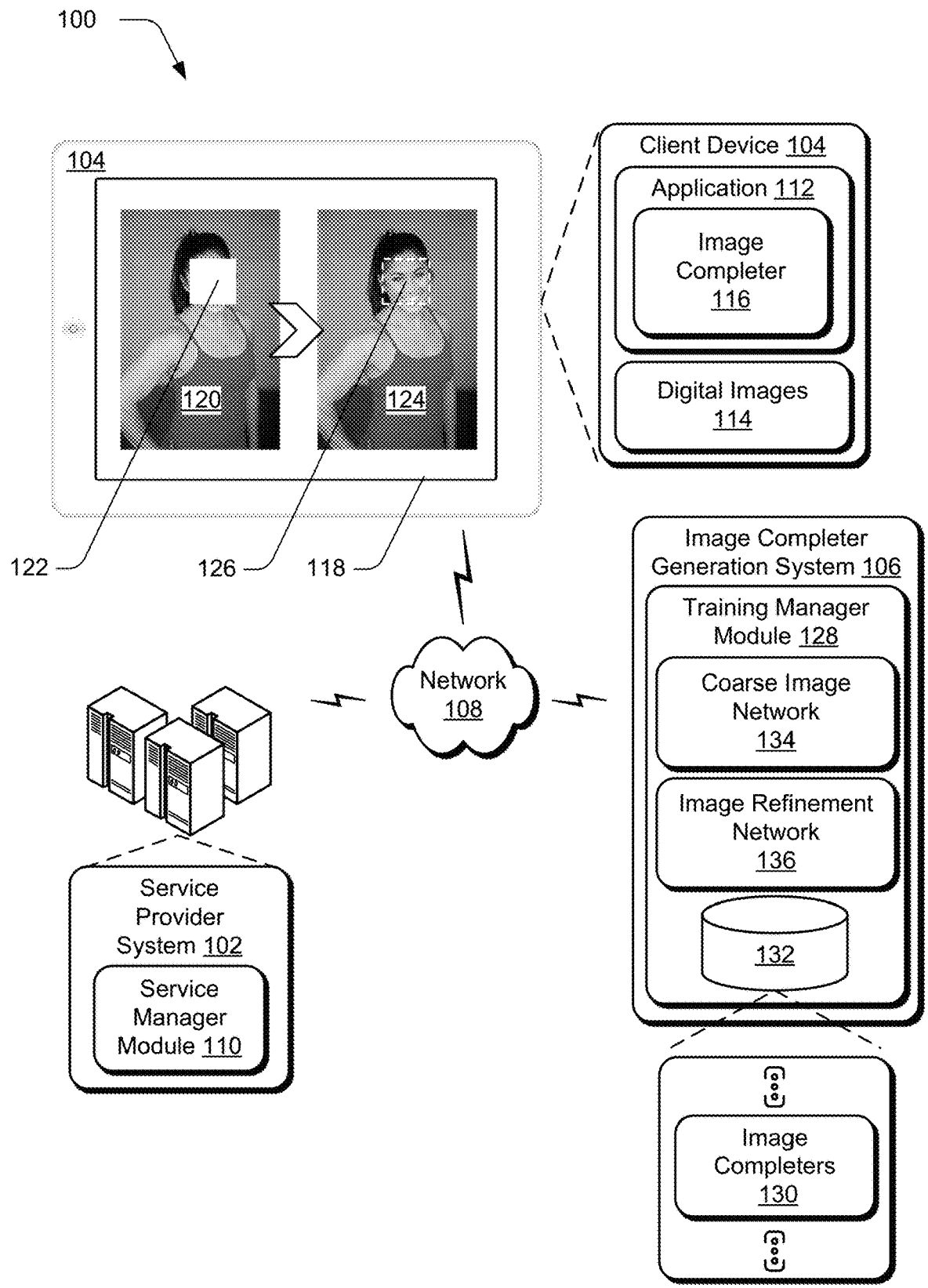
FIG. 1 is an illustration of an environment in an example implementation that is operable to employ techniques described herein.

In some cases, depicted imagery is removed from digital images, e.g., blemishes, profanity, unwanted foreground objects, and so on. This imagery can be removed via user input or automatically by a content creation system. In any case, this removal is effective to introduce holes into the digital image. Conventional techniques for filling such holes use systems that fail to produce boundary consistent, semantically reasonable, and visually pleasant digital content to fill the holes. By way of example, these conventionally configured systems generate content that includes artifacts near a boundary of the hole and/or fails to match remaining imagery of the holey image. Due to this matching failure, these conventionally configured systems also perform post-processing operations to match the generated hole-filling digital imagery to the remaining imagery of the holey image, e.g., Poisson image blending. These systems therefore impose a burden on computing resources, in part, because the hole-filling content output by them must be post-processed to be suitably incorporated with the holey digital image.

To overcome these problems, digital image completion by learning generation and patch matching jointly is leveraged in a digital medium environment. Initially, a digital image having at least one hole is received. This can occur in a scenario where a client device user selects to remove portions of the digital image thereby introducing the at least one hole and where the client device user then selects an option to fill the hole. Responsive to such an option, the digital image having the hole is provided to an image completion system. Holey images can be provided to the image completion system based on a variety of other operations without departing from the spirit or scope of the described techniques.

In general, the image completion system includes or has access to an image completer configured to output filled images based on received holey images. To do so, the image completer generates hole-filling content for incorporation into the holey images in place of the holes. In one or more implementations, the image completer is configured to have a dual-stage network framework that combines, in series, a coarse image network and an image refinement network. The image refinement network is further configured, in one or more implementations, according to a multi-pathway framework that includes a contextual attention pathway and a convolutional pathway.

In accordance with the described techniques, a training system trains the coarse image network to generate a coarse prediction of content for filling holes of a holey digital image. Broadly speaking, this coarse prediction is not intended to serve as final imagery for filling holes. Rather, it is configured to serve as a basis for subsequent refining by the image refinement network. Accordingly, the coarse image network is trained to generate predictions that generally approximate content which is semantically reasonable for filling holes. During training, the training system compares outputs of the coarse image network to training images using reconstruction loss. However, the training system does not strongly enforce the reconstruction loss in relation to the coarse prediction, e.g., by allowing the network to output imagery with a lower level of detail than the remaining imagery of the holey image and/or the imagery ultimately output by the dual-stage network framework.

This coarse prediction is provided as input to the image refinement network. Broadly speaking, the image refinement network receives a more complete scene than the coarse image network—a digital image with a coarse prediction in place of holes is a more complete scene than a digital image with holes. Due to this, the image refinement network is able to generate content for filling holes that has more detail than the coarse prediction. Indeed, the image refinement network generates a refined fill for filling holes of the holey image based on the coarse prediction. The image refinement network refines the coarse prediction by leveraging patch-matching functionality of the contextual attention pathway and convolutional content-generation functionality of the convolutional pathway. In particular, the contextual attention pathway uses information corresponding to patches of known pixels (e.g., pixels of a holey image that depict content) as convolutional filters to process patches generated by the convolutional pathway based on the coarse prediction. The output of these individual pathways is combined to form a filled image having refined imagery in place of any holes. During training, the training system compares outputs of the image refinement network to training images using both reconstruction loss and general adversarial network (GAN) losses, e.g., determined according to a Wasserstein GAN with gradient penalty (WGAN-GP) function.

Based on the comparisons of the training images to the intermediate images and the comparisons of the training images of the filled images having the refined fill, the training system adjusts parameters of the dual-stage framework, e.g., weights associated with different neural-network layers. In particular, the training system adjusts the parameters to improve the ability of the dual-stage framework to generate visually realistic and semantically plausible imagery for holes of the training images that is coherent with existing imagery of those images. As a result, the image completer outputs, without post-processing operations, a filled digital image where holes are filled with boundary consistent, semantically reasonable, and visually pleasant digital content. In so doing, the burden of having to perform post-processing operations is not imposed on image completion systems configured according to the described techniques. In contrast to conventionally configured image completion systems, the described image completer (e.g., having the dual-stage network framework) also fills holes of various shapes and holey images with multiple holes. The dual-stage framework also improves training stability and speed over conventional systems. Due to this, configuring systems according to the described dual-stage framework is effective to reduce a training time of the framework, such as from two months to a week. Moreover, the dual-stage framework not only enables synthesis of novel image structures that may not appear elsewhere in a holey digital image (e.g., complex, non-repetitive structures such as faces and objects), but also explicitly utilizes surrounding image features as references during training to make better predictions than conventional systems, e.g., from a coarse initially filled image to an output image that is filled with a refined fill.

Term Descriptions

As used herein, the term "hole" refers to a set of pixels (e.g., multiple contiguous pixels) of a digital image having a set of values indicating an absence of depicted imagery. By way of example, these pixels may have null values or other values indicative of no content. In one or more implementations, these pixels may have values that cause the pixels to be displayed as white or as black. Indeed, the pixels may simply be associated with white or black pixel values. In any case, these holes appear to be inconsistent with remaining imagery depicted in holey digital images. Holes may be introduced into digital images based on a variety of operations as discussed above and below.

As used herein, the term "inpainting" refers to filling a hole of a digital image by determining values to assign to pixels of the digital image corresponding to the hole.

As used herein, the term "coarse prediction" refers to generated content that approximates imagery for filling holes of digital images, but that includes less detail than the depicted imagery that remains in a holey image, e.g., the non-hole portions of the holey image. Broadly speaking, the coarse prediction may predict a structure of imagery used to fill a hole with a low level of granularity whereas refinement of the coarse prediction may refine the imagery so that it has a higher level of granularity, e.g., the refined imagery has a higher perceived resolution.

As used herein, the term "hallucination" refers to determining pixel values for pixels of a hole in a way that fills the hole with semantically reasonable content. Consider an example in which a hole is introduced to a digital image of a person, removing a majority of the person's face. In this example, the described system "hallucinates" content depicting a face to replace the hole.

As used herein, the term "photo-realistic" refers to a characteristic of depicted content to appear as if it is actually part of a scene captured by an image-sensing device, e.g., a digital camera. This contrasts with depicted content appearing as if it has been generated by a computer (or drawn by a client device user) and incorporated into a digital image.

The term "post-processing" refers to operations performed in relation to digital images to modify the depicted content of those images. By way of example, post-processing operations include zooming, cropping, scaling, blending, filtering, selective color changing, and so forth. Post-processing may encompass a variety of other image modification operations without departing from the spirit or scope of the described techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital image completion by learning generation and patch matching jointly as described herein. The illustrated environment 100 includes a service provider system 102, client device 104, and image completer generation system 106 that are communicatively coupled, one to another, via a network 108.

Computing devices that are usable to implement the service provider system 102, client device 104, and image completer generation system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 8.

The service provider system 102 is illustrated as including a service manager module 110 that is representative of functionality to provide services accessible via the network 108 to client device users. The service manager module 110, for instance, may expose content or functionality that is accessible via the network 108 by an application 112 of the client device 104. The application 112 may be configured as a network-enabled application, a browser, a native application, and so on, that obtains data from the service provider system 102 via the network 108. This data can be employed by the application 112 to enable a user of the client device 104 to communicate with the service provider system 102, such as to receive application updates and features when the service provider system 102 provides functionality to manage content editing applications.

In the context of the described techniques, the application 112 includes functionality to edit digital content, such as digital images 114. In the illustrated example, the application 112 includes image completer 116 that is implemented at least partially in hardware of the client device 104, in part, to fill holes of holey digital images. Broadly, speaking a "hole" refers to a set of pixels of a digital image having a set of values indicating an absence of depicted content. In these regions, depicted content may have been removed, such that the corresponding pixels have null values, empty values, values for white pixels, values for black pixels, and so forth. A hole may be present in a digital image 114 due to a user of the client device 104 interacting with the application 112 to remove an object from a digital image, to erase a portion of the image, to cut a portion from the image, and so on. Alternately or in addition, the application 112 may introduce holes into the digital images, such as by removing portions of an image automatically, e.g., based on a user selection to remove particular content (e.g., profanity, trademarked content, blemishes, etc.), user selection of an auto-correction feature, and so on.

In any case, the client device 104 is shown displaying, via display device 118, holey image 120 having hole 122. The image completer 116 is configured to fill the hole 122 of the holey image 120 to produce filled digital image 124. Rather than the hole 122, the filled digital image 124 includes network-generated content 126. In one or more implementations, the image completer 116 generates the network-generated content 126 by determining values for the corresponding pixels with a machine-learning model (e.g., a neural network) trained using deep learning. The image completer 116 determines these values in substantially real-time to generate the network-generated content 126 so that, without post-processing, the network-generated content 126 is consistent with remaining content of the holey image 120 proximate a boundary of the hole 122, semantically reasonable, and visually pleasant. The image completer 116 is also capable of filling multiple holes of a holey image and filling holes having a variety of shapes, e.g., rectangular, ellipsoid, non-geometric, and so forth. In other words, the image completer 116 may be configured as a fully convolutional end-to-end neural network that takes as input a holey image (having one or more holes) and outputs a filled digital image (where each of the holes is filled with content determined by the image completer 116).

To provide the client device 104 with the application 112 having the image completer 116, the service provider system 102 may leverage the image completer generation system 106. Although functionality of the image completer generation system 106 is illustrated as separate from the service provider system 102, this functionality may also be incorporated as part of the service provider system 102, further divided among other entities, and so forth. Additionally or alternately, an entirety or portions of the functionality of the image completer generation system 106 may be incorporated as part of the client device 104. The image completer generation system 106 includes a training manager module 128 that is implemented at least partially in hardware of a computing device, in part, to deploy deep learning to generate image completers 130, which are illustrated in storage 132. The image completer 116, for instance, may correspond to one of the image completers 130 generated using functionality of the training manager module 128.

To generate the image completers 130, the training manager module 128 is configured to train coarse image network 134 and image refinement network 136. The training manager module 128 generates a trained machine-learning model (e.g., a feed-forward generative network) based on the training of the coarse image network 134 and the image refinement network 136. This trained machine-learning model is incorporated in, or otherwise accessible to the image completers 130. In general, the coarse image network 134 represents functionality to output an initial coarse prediction of content for filling a hole of a holey image. In one or more implementations, the training manager module 128 trains the coarse image network 134 based, in part, on reconstruction loss.

In contrast, the image refinement network 136 represents functionality to receive the coarse prediction of content as input and generate a prediction of refined results. In contrast to the training of the coarse image network 134, the training manager module 128 trains the image refinement network 136 based on not only reconstruction loss, but also generative adversarial network (GAN) losses. Due to receiving image information with a coarse prediction in place of a hole, the image refinement network 136 is generally exposed to a more complete scene than the coarse image network 134, which receives an image with a missing region (hole). Accordingly, the image refinement network 136 determines a more complete (refined) feature representation for filling an image than the coarse image network 134.

In accordance with the described techniques, the training manager module 128 trains the image refinement network 136 to refine an intermediate input image, which includes a coarse prediction, using "contextual attention." Broadly speaking, this means that the training manager module 128 trains a contextual attention layer of the image refinement network 136 to identify regions of the input image—not regions corresponding to the hole and thus the coarse prediction—that can be borrowed to fill the hole. In other words, this contextual attention layer determines existing feature information (e.g., color, depicted content structure, brightness, and so forth) for copying to a hole of a holey image. In one or more implementations, the training manager module 128 configures the image refinement network 136 with two parallel encoders—a first encoder that includes the contextual attention layer and a second encoder that includes convolution layers leveraged for generating content to fill the hole. The training manager module 128 merges the results of these two encoders to produce the filled digital image 124.

The image completer generation system 106 provides a variety of advantages by combining the coarse image network 134 and the image refinement network 136 to form the image completers 130 in this way. By way of example, the image completer generation system 106 reduces an amount of time it takes to train an image completer—from months using conventional techniques to days with the described techniques. The image completer generation system 106 also uses fewer hardware resources than conventional techniques to train the networks. The described image completer generation system 106 is thus more efficient than conventional systems that generate image completers. Additionally, the image completers 130 complete holey images without utilizing post-processing techniques, e.g., color adjustment. Image completers 130 configured according to the described techniques thus do not place the further burden on computing device resources of carrying out post-processing techniques during operation.

Having considered an example environment, consider now a discussion of some example details of the techniques for digital image completion by learning generation and patch matching jointly in a digital medium environment in accordance with one or more implementations.

Image Completion by Learning Generation and Patch Matching Jointly

Figure 2:
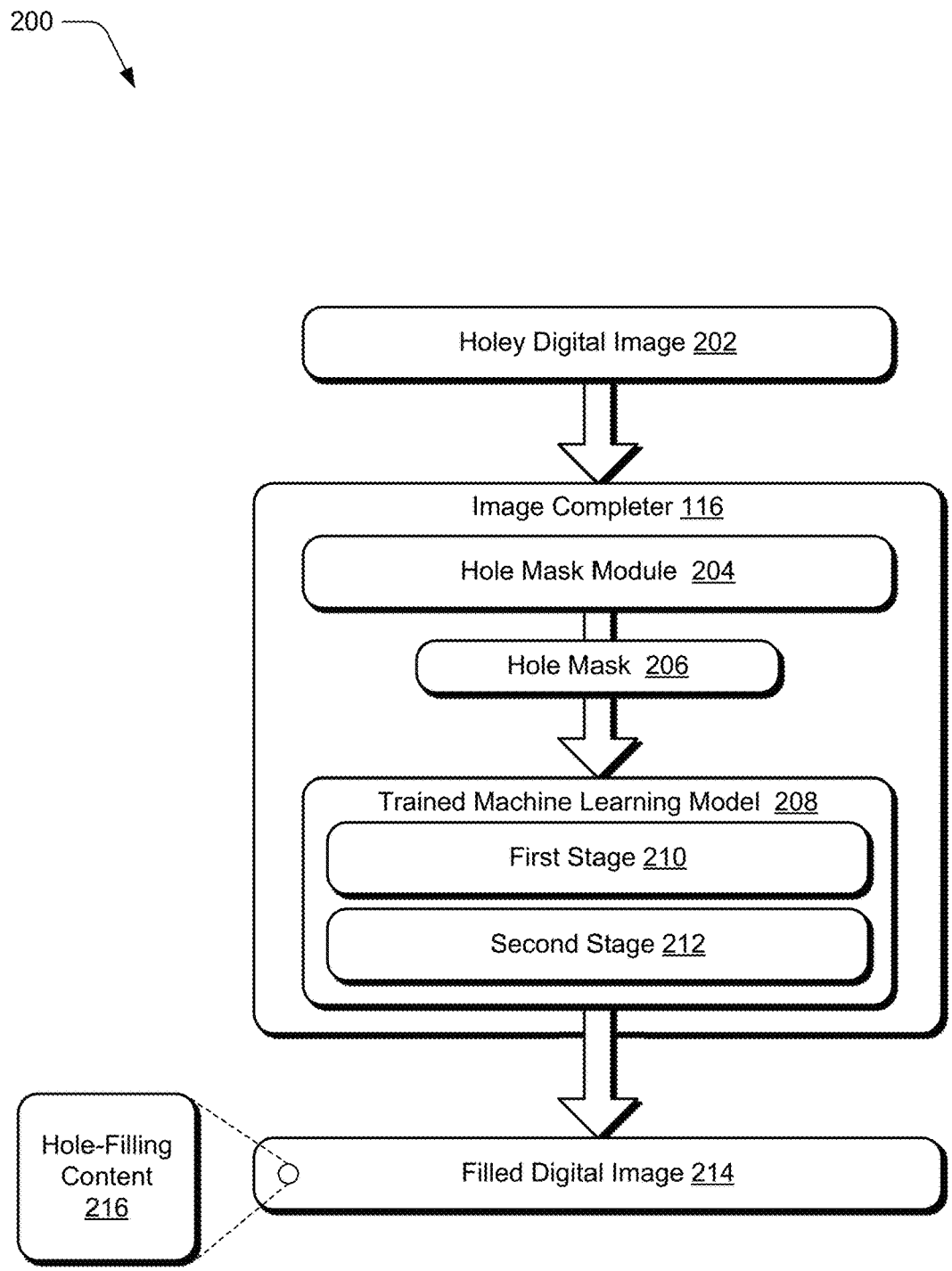
FIG. 2 depicts an example implementation in which an image completion system generates a filled digital image from a holey digital image using a machine-learning model trained with a dual-stage framework having coarse-filling and refinement stages.

FIG. 2 depicts a system 200 in an example implementation in which an image completion system generates a filled digital image from a holey digital image using a machine-learning model trained with a dual-stage framework having coarse-filling and refinement stages. In the illustrated example, the image completer 116 of FIG. 1 is illustrated in more detail and serves as at least a portion of the image completion system.

In this example 200, the image completer 116 is shown obtaining holey digital image 202. The holey digital image 202 may include one or more holes in depicted digital content, which have any of a variety of shapes. These holes may be present in the holey digital image 202 due to a variety of content removal operations, as discussed above.

The image completer 116 is also depicted having hole mask module 204, which represents functionality to generate hole mask 206. Broadly speaking, the hole mask 206 is indicative of the holes in the holey digital image 202. By way of example, the hole mask 206 may be configured to include a value for each pixel of the holey digital image 202, where the value indicates whether the pixel corresponds to a hole or not. For instance, the hole mask 206 may include a value of '1' for pixels that correspond to remaining depicted content of the holey digital image 202 and a value of '0' for pixels that correspond to a hole of the holey digital image 202. The hole mask 206 may indicate the holes of the holey digital image 202 in different ways without departing from the spirit or scope of the techniques described herein.

In any case, trained machine-learning model 208 receives the holey digital image 202 and the hole mask 206 as input. In one or more implementations, the trained machine-learning model 208 is a feed-forward generative network. In accordance with the described techniques, the trained machine-learning model 208 is a network with two stages—first stage 210 and second stage 212. In the context of the example environment 100, the first stage 210 and the second stage 212 correspond to the coarse image network 134 and the image refinement network 136, respectively. As discussed above and below, the first stage 210 represents functionality to generate a coarse prediction (not shown) of the content missing from the holey digital image 202. In one or more implementations, the first stage 210 is configured as a simple dilated convolutional network trained with reconstruction loss to generate the coarse prediction.

The second stage 212 receives the holey digital image 202 having the coarse prediction as input. The second stage 212 refines the coarse prediction and generates filled digital image 214, which includes hole-filling content 216. In accordance with the described techniques, the second stage 212 is configured with two parallel pathways, one of which is a contextual attention pathway and the other is a convolutional pathway. Broadly speaking, the contextual attention pathway identifies features of known patches of content remaining in the holey digital image 202 for use as convolutional layers to process generated patches for the holes of the holey digital image 202. In contrast, the convolutional pathway is configured to determine and construct content (e.g., including facial features, objects, and other complex, non-repetitive structures) for filling holes of the holey digital image 202 based on the coarse prediction. In the context of training a machine-learning model to produce the trained machine-learning model 208, consider FIG. 3.

Figure 3:
FIG. 3 depicts an example implementation of the dual-stage framework for training a machine-learning model.

FIG. 3 depicts an example 300 of an implementation of the dual-stage framework for training a machine-learning model. In particular, the illustrated example 300 represents a base framework according to which the training manager module 128 generates and trains a machine-learning model to fill holes of the holey digital image 202, e.g., to produce the trained machine-learning model 208.

The illustrated example 300 includes from FIG. 1 the coarse image network 134 and the image refinement network 136. In addition to constructing the framework as illustrated in FIG. 3, the training manager module 128 is further configured to construct the image-refinement portion of the framework in accordance with the configuration described in relation to FIGS. 4 and 5. In other words, the training manager module 128 may alternately or additionally generate the image refinement network 136 to have two parallel pathways, one of which includes the contextual attention layer discussed specifically in relation to FIG. 5. With regard to the base framework of the illustrated example 300, though, consider the following discussion in accordance with the described techniques.

The illustrated example 300 represents a scenario in which the training manager module 128 trains the coarse image network 134 and the image refinement network 136. In accordance with the described techniques, the training manager module 128 carries out this training by pre-processing a set of images, inputting these processed images to the framework so that the networks can generate content for filling holes of the input images, and comparing the filled images output by the framework to the original images—the images of the set prior to introduction of holes via the pre-processing. Based on the comparison, the training manager module 128 adjusts parameters of the framework (e.g., weights associated with nodes in various neural-network layers) to improve the ability of the framework during training to generate visually realistic and semantically plausible pixels for holes of the training images that are coherent with existing pixels of those images.

In the following discussion, this training process is discussed further in relation to training image 302, which is representative of a single digital image included in a set of training digital images. As part of the above-introduced pre-processing, the training manager module 128 enforces size criteria and introduces a hole to the training image 302 to generate input holey image 304. To enforce size criteria, for instance, the training manager module 128 includes functionality to crop digital images in the training set to a predetermined size, e.g., 256 pixels by 256 pixels. In this way, each of the training images input to the framework during training has a same size. Once trained, however, the trained machine-learning model 208 is capable of receiving digital images of different sizes as input and filling them—the trained machine-learning model 208 is not limited to images having the predetermined size.

In addition to enforcing a size criteria, the training manager module 128 introduces hole 306 as part of the pre-processing. To introduce the hole 306, the training manager module 128 randomly selects (e.g., via a random sample technique) a rectangular region of the training image 302 for removal. The training manager module 128 modifies the pixels of the selected rectangular region to indicate missing content, such as by converting the pixel values to a value corresponding to white—the introduced hole 306 is thus a white rectangle. Based on the random sampling, the holes introduced into different training images may be located at different regions of those images. In contrast to being limited to a single rectangular hole, in operation, the trained machine-learning model 208 is capable of receiving (and filling) digital images having one or more holes, each having any one of a variety of shapes. Accordingly, the trained machine-learning model 208 is not limited to filling rectangular shaped holes or just a single hole per input image—though the trained machine-learning model 208 may also be leveraged in scenarios to fill a holey image having a single, rectangular hole.

Continuing with the illustrated example 300, the training manager module 128 provides the input holey image 304 as input to the coarse image network 134. Broadly speaking, the coarse image network 134 generates coarse prediction 308 to initially fill the hole 306. The illustrated example 300 includes intermediate image 310, which is comprised of the portions of the training image 302 that the training manager module 128 did not "remove" as part of introducing the hole 306 and also of the coarse prediction 308 in place of the hole 306. In accordance with the described techniques, the coarse image network 134 outputs the intermediate image 310. The training manager module 128 trains the coarse image network 134—to improve its ability to generate semantically reasonable coarse predictions—by comparing the intermediate image 310 to the training image 302. By way of example, the training manager module 128 compares the intermediate image 310 and the training image 302 using reconstruction loss. In one or more implementations, the training manager module 128 is limited to performing these comparisons for the coarse image network 134 using reconstruction loss. This contrasts with the comparisons performed for the image refinement network 136, which involve both reconstruction loss and generative adversarial network (GAN) losses.

In one or more implementations, the coarse image network 134 is configured according to a thin and deep scheme, which improves an efficiency of the network in relation to at least some differently configured, conventional networks. The coarse image network 134 is also configured based on fewer network parameters than a conventional network. In terms of layer implementation, the coarse image network 134 is configured to include mirror padding for each convolution layer and without batch normalization layers. Both the coarse image network 134 and the image refinement network 136 are depicted having dilated convolution layers (e.g., the hashed layers) in the illustrated example 300. With respect to activation, the coarse image network 134 is activated based on exponential linear unit (ELU) activation functions rather than rectified linear unit (ReLU) activation functions. In accordance with the described techniques, the coarse image network 134 is configured to clip output filter values instead of using tanh or sigmoid functions, e.g., an output layer of the coarse image network 134 clips the filter values. It is to be appreciated that the image refinement network 136 or at least a pathway of the image refinement network 136 may be configured in a similar fashion without departing from the spirit or scope of the described techniques.

Turning now to a discussion of the reconstruction loss used to train the coarse image network 134, and used along with GAN losses to train the image refinement network 136, in accordance with the described techniques. Broadly speaking, reconstruction loss is based on the principle that hole filling for digital images, which may be referred to as image "inpainting," involves "hallucination" of pixels, such that multiple different combinations of pixel values can be hallucinated to provide a plausible solution for filling a given hole. As used herein, the term "hallucination" refers to determining pixel values for the pixels of a hole in a way that fills the hole with semantically reasonable content. Consider an example in which a hole is introduced to a digital image of a person, removing a majority of the person's face. In this example, multiple semantically reasonable combinations of pixels may be determined to "hallucinate" a face for the hole. In other words, a machine-learning model may determine any one of different combinations of pixel values for the pixels of the hole to achieve a variety of faces with different facial features (e.g., different shaped noses, different shaped eyes) that are acceptable as the face for the person.

With the understanding that many plausible solutions are acceptable for filling a hole, it is to be appreciated that in some scenarios, a plausible filled image has patches or pixels (of the hole) that are different from those in an original image, e.g., an original training image. Since the training manager module 128 uses the training image 302 as the ground truth for computing reconstruction loss—the training image 302 is the image to which output of the neural networks is compared—strong enforcement of reconstruction loss in the pixels corresponding to the hole 306 can mislead the training process of a convolutional network. In other words, strong enforcement of reconstruction loss in relation to hole-filling pixels can mislead training of the coarse image network 134 and at least a portion of the image refinement network 136.

Due in part to the possibility of misleading the networks during training, the training manager module 128 does not strongly enforce the reconstruction loss. Instead, the training manager module 128 trains the networks based on a spatially discounted reconstruction loss using a weight mask. The training manager module 128 generates this weight mask by computing a weight for each pixel in the mask based on a distance of the pixel to a nearest pixel having a known value, e.g., a pixel that is not part of the hole. In one or more implementations, the training manager module 128 computes the weight mask as $\gamma^l$, where l is the distance of the pixel to the nearest known pixel. As one example, the training manager module 128 uses '0.99' for the term $\gamma$.

The training manager module 128 provides the intermediate image 310 as input to the image refinement network 136. In one or more implementations, the image refinement network 136 is configured according to the dual-pathway framework discussed in relation to FIG. 4. Due to receiving the intermediate image 310, the image refinement network 136 receives a more complete scene than the coarse image network 134. The scene depicted in the intermediate image 310 is "more complete" than the scene depicted in the input holey image 304. This is because the input holey image 304 is missing regions, such as the pixels corresponding to the hole 306. Further, this enables the image refinement network 136 to learn a better feature representation than the coarse image network 134.

Figure 4:
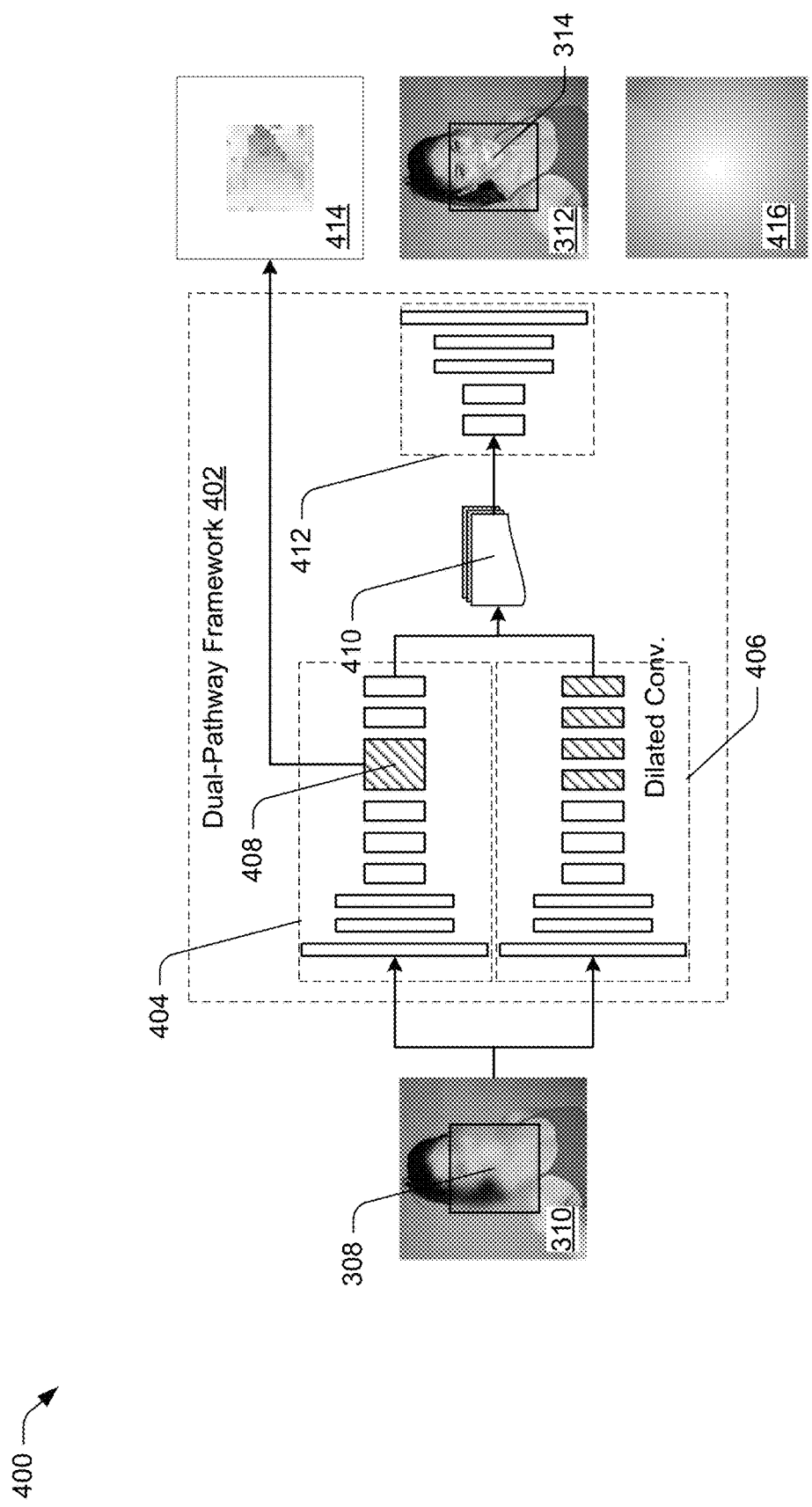
FIG. 4 depicts an example implementation of a refinement stage of the dual-stage framework.

Regardless of whether the image refinement network 136 is configured as a single-path convolutional neural network (as illustrated in FIG. 3) or as a dual-path framework which includes a convolutional pathway (as illustrated in FIG. 4), the image refinement network 136 outputs filled image 312. In general, the image refinement network 136 refines the coarse prediction 308 and replaces the coarse prediction with refined fill 314. As output by the image refinement network 136, the filled image 312 includes the portions of the training image 302 that the training manager module 128 did not "remove" when introducing the hole 306 and also includes the refined fill 314 in place of the hole 306. The training manager module 128 trains the image refinement network 136—to improve its ability to refine coarse predictions to generate semantically reasonable content for holes—by comparing the filled image 312 to the training image 302.

As noted above, the training manager module 128 uses reconstruction loss (e.g., spatial reconstruction loss) for this comparison. The training manager module 128 also uses GAN losses for comparisons associated with training the image refinement network 136. The use of GAN losses to train the image refinement network 136 is represented by global critic 316 and local critic 318. In general, the global critic 316 represents functionality to determine whether the filled image 312—the remaining portions of the training image 302 and the refined fill 314 together—corresponds to computer-generated content or not. In contrast, the local critic 318 represents functionality to determine whether the refined fill 314 corresponds to computer-generated content or not.

In one or more implementations, the training manager module 128 implements the global and local critics 316, 318 as global and local Wasserstein Generative Adversarial Networks (GANs). In contrast to conventional systems which use deep convolutional generative adversarial network (DCGAN) for adversarial supervision, the global and local critics 316, 318 of the described system are implemented using a WGAN with a gradient penalty (WGAN-GP). In other words, the training manager module 128 supervises the global and local outputs of the global and local critics 316, 318, respectively, using WGAN-GP. In accordance with the described techniques, the training manager module 128 may leverage WGAN-GP that is modified as described below. Use of the described WGAN-GP is effective to enforce consistency for the outputs of the global and local critics 316, 318. It is to be appreciated that systems implemented using WGAN-GP loss outperform systems implemented using mere GAN loss in relation to image generation tasks—such as generating content for filling the hole 306. As described further below, the training manager module 128 implements the global and local critics 316, 318 of the described system using $l_1$ reconstruction loss in combination with the modified WGAN-WP. This provides an improved system over conventional approaches because the reconstruction loss and WGAN-GP both leverage the $l_1$ distance metric.

For comparing the filled image 312 to the training image 302 (and the refined fill 314 to the region of the training image removed to introduce the hole 306), the training manager module 128 leverages WGAN with the Earth mover distance (the Wasserstein-1 distance), which is represented in the following discussion as $W(\mathbb{P}_r, \mathbb{P}_g)$. The modified WGAN-GP function used by the training manager module 128 to train the framework is obtained by forming the function according to the Kantorovich-Rubenstein duality, which in one example is expressed according to the following:

$$\min_G \max_{D \in \mathcal{D}} E_{x \sim \mathbb{P}_r}[D(x)] - E_{\tilde{x} \sim \mathbb{P}_g}[D(\tilde{x})]$$

Here, the term $\mathcal{D}$ represents the set of 1-Lipschitz functions. In general, a function $f$ that is defined as "Lipschitz" maps real-number variables to real numbers as output. Given possible variables A for the function $f$ for instance, the values of the variables A are a subset of any real numbers such that $A \subset \mathbb{R}^n$, where $\mathbb{R}^n$ is the set of any real number. Further, the function $f$ maps the variables A to real numbers as output such that $f: A \to \mathbb{R}^m$, where $\mathbb{R}^m$ is a set of mapped real numbers. The function $f$ is considered "L-Lipschitz,"

where the value of L is greater than or equal to zero, if the following is true for each pair of points in the set of variables A:

$$|f(a)-f(b)| \leq L|a-b|$$

Here, the terms a and b represent different points from the set of variables A such that a, b∈A. Referring again to the modified WGAN-GP function, which the training manager module 128 uses to train the framework, the term $\mathbb{P}_g$ is a model distribution defined by $\tilde{x}=G(z)$, where the term z represents input to the global and local critics 316, 318. In other words, the term z represents the filled image 312. In connection with scenarios where the training manager module 128 leverages this modified WGAN-GP function, the training manager module 128 also uses a gradient penalty for the training. In one or more implementations, the training manager module 128 uses the following gradient penalty with the noted-modified WGAN-GP function:

$$\lambda E_{\hat{x} \sim \mathbb{P}_{\hat{x}}}(\|\nabla_{\hat{x}} D(\tilde{x})\|_2 - 1)^2$$

Here, the term λ represents a weighting hyper-parameter. Broadly speaking, the term $\tilde{x}$ represents a sample from a straight line between points $\mathbb{P}_g$ and $\mathbb{P}_r$—a uniform interpolation between the ground truth patches x and the patches $\tilde{x}$ output by the image refinement network 136 during training. This is because a gradient of D* at all points on the straight line $\tilde{x}=(1-t)x+t\tilde{x}$ are to point directly toward the current sample $\tilde{x}$. In one or more implementations, the training manager module 128 computes a change in gradient $\nabla_{\tilde{x}} D^*(\tilde{x})$, which is computed for the selected sample $\tilde{x}$, according to the following:

$$\nabla_{\tilde{x}} D^*(\hat{x}) = \frac{\tilde{x} - \hat{x}}{\|\tilde{x} - \hat{x}\|}$$

To fill the hole 306 of the input holey image 304, the training manager module 128 limits the coarse image network 134 and the image refinement network 136 to predicting patches for pixels that correspond to the hole 306. The training manager module 128 does not cause these networks to predict patches for the pixels that correspond to depicted content which remains after the hole 306 has been introduced. To limit the networks in this way, the training manager module 128 determines an input mask, represented by the term m and which is representative of the pixels that correspond to the hole 306. The training manager module 128 is capable of determining this input mask m as described above in relation to the hole mask 206. In the following example, the mask value is '0' for pixels corresponding to the hole and '1' for pixels corresponding to remaining content. In one or more implementations, the training manager module 128 leverages this mask by multiplying it with the noted-modified WGAN-WP in accordance with the following:

$$\lambda E_{\hat{x} \sim \mathbb{P}_{\hat{x}}}(\|\nabla_{\tilde{x}} D(\tilde{x}) \odot (1-m)\|_2 - 1)^2$$

To compute a difference between points $\mathbb{P}_r$, $\mathbb{P}_g$—in terms of the $l_1$ distance metric—the training manager module 128 uses a weighted sum of pixelwise $l_1$ loss. This contrasts with conventional systems that use a mean-square-error approach. Additionally, the training manager module 128 uses the WGAN adversarial losses with the weighted sum of pixelwise $l_1$ loss. In one or more implementations, the training manager module 128 compares the outputs of the global and local critics 316, 318 using a Wasserstein-1 distance in WGAN, which is based on discounted $l_1$ loss and determined according to the following equation:

$$W(\mathbb{P}_r, \mathbb{P}_g) = \inf_{\gamma \in \Pi(\mathbb{P}_r, \mathbb{P}_g)} E_{(x,y) \sim \gamma}[\|x - y\|]$$

Here, the term $\Pi(\mathbb{P}_r, \mathbb{P}_g)$ represents a set of all joint distributions of γ(x,y), the marginals of which are respectively the points $\mathbb{P}_r$ and $\mathbb{P}_g$. In general, the pixelwise reconstruction loss regresses the hole 306 to the ground truth image, e.g., the training image 302. Further, the WGAN-GP causes the framework to learn to match potentially correct images and train the global and local critics 316, 318 with adversarial gradients. Since both the reconstruction loss and the WGAN-GP loss measure pixelwise $l_1$ distances, the combined loss enables the training manager module 128 to more efficiently train the framework and more stably perform optimization than conventional systems.

In contrast to the single pathway convolutional network depicted in the illustrated example 300, the image refinement network 136 may additionally or alternately be implemented with two parallel pathways in accordance with the described techniques. In this context, consider FIGS. 4 and 5. FIG. 4 depicts an example 400 of an implementation of a refinement stage of the dual-stage framework.

From FIG. 3, the illustrated example 400 includes the intermediate image 310 having the coarse prediction 308, which the training manager module 128 provides as input to dual-pathway framework 402. The dual-pathway framework 402 represents an example implementation of the image refinement network 136. In any case, the illustrated example 400 also includes the filled image 312 having the refined fill 314 from FIG. 3. The training manager module 128 receives the filled image 312 having the refined fill 314 as output from the dual-pathway framework 402.

In the illustrated example 400, the dual-pathway framework 402 includes first encoder 404 and second encoder 406. The second encoder 406 represents a convolutional pathway of the dual-pathway framework 402. This second encoder 406 is configured to hallucinate contents to produce a proposal for the refined fill 314 using layer-by-layer convolution, e.g., dilated convolution as illustrated. In contrast, the first encoder 404 represents a contextual attention pathway of the dual-pathway framework 402, and includes contextual attention layer 408.

In general, convolutional neural networks process image features using a local convolutional kernel layer-by-layer and do not identify features for content generation that are from distant spatial locations of an image under consideration, e.g., beyond a threshold distance in terms of pixels from the hole. As discussed in the following, the contextual attention pathway of the described system overcomes this limitation—the contextual attention pathway is capable of identifying features for content generation that are from distant spatial locations of the image under consideration. In this context, the first encoder 404 generally represents functionality to identify regions of an image—that remain after holes are introduced to the image—having feature information that can be copied to fill a hole. These pixel regions that depict content prior to any hole filling, e.g., the non-hole regions, may be referred to as "known" patches. In contrast, the regions of pixels that correspond to the holes may be referred to as "missing" patches. Further, the contextual attention layer 408 is differentiable and fully convolutional. This means that the training manager module 128 may train the contextual attention layer 408 in deep models because this layer is differentiable. This also means that the contextual attention layer 408 can be used in operation to fill holes of images with various resolutions. For an example implementation of the contextual attention layer 408, consider FIG. 5.

Figure 5:
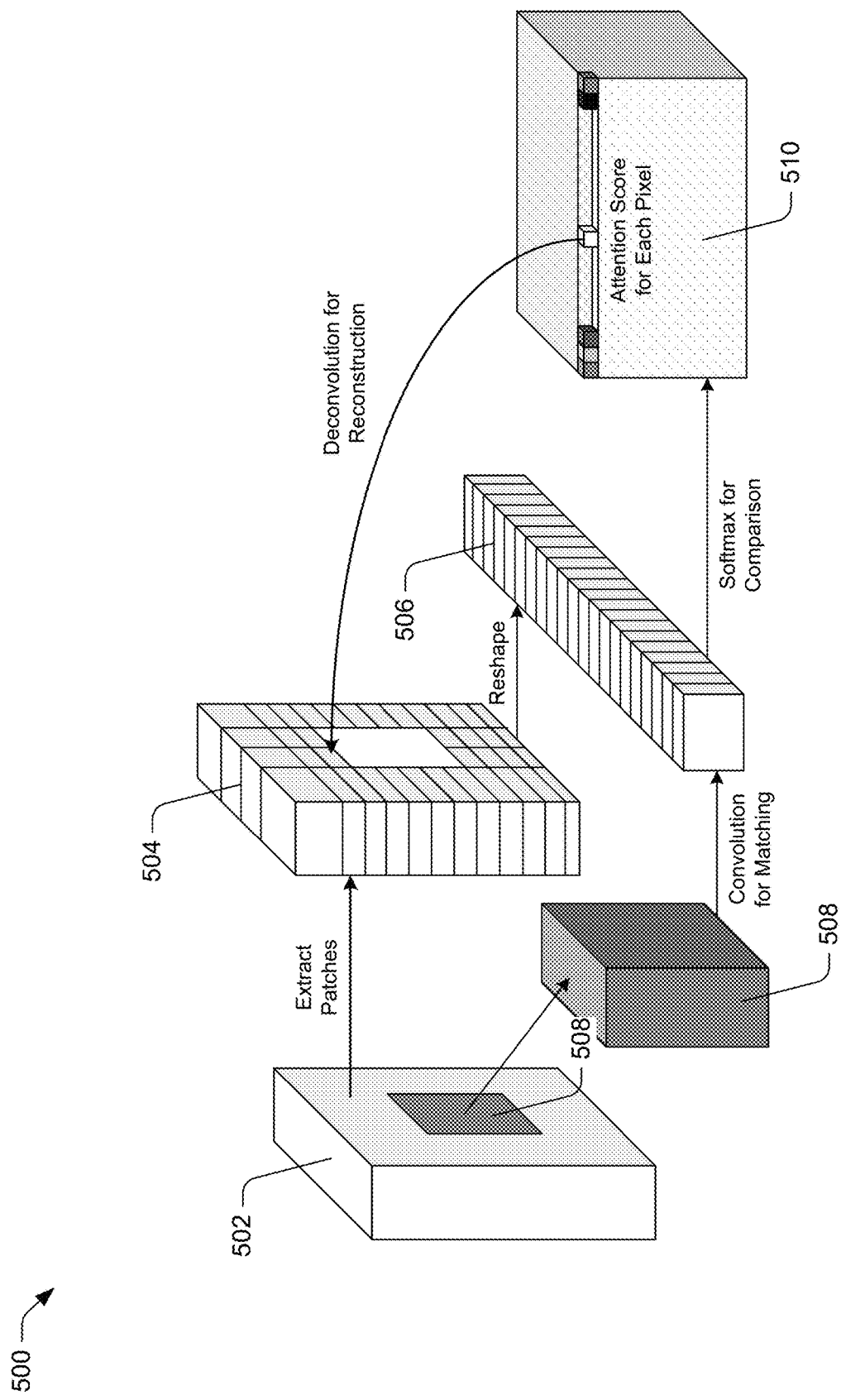
FIG. 5 depicts an example implementation of a framework layer that learns to borrow information to fill a hole of an image from image patches depicting content.

FIG. 5 depicts an example 500 of an implementation of a layer of the refinement stage that learns to borrow information to fill a hole of an image from image patches depicting content. In one or more implementations, the illustrated example 500 corresponds to functionality represented by the contextual attention layer 408 of the first encoder 404. In the following discussion, consider a scenario in which the contextual attention layer 408 matches features determined for missing pixels of the intermediate image 310 (e.g., the pixels corresponding to the coarse prediction 308) to features of known pixels (e.g., the other pixels of the intermediate image 310).

In this scenario, the contextual attention layer 408 initially extracts known patches from input features 502, which are indicative of the intermediate image 310. Based on this patch extraction, the contextual attention layer 408 produces extracted known patches 504. In one or more implementations, the contextual attention layer 408 extracts patches having a size of three pixels by three pixels, though other sized patches may be extracted without departing from the spirit or scope of the described techniques. Further, the contextual attention layer 408 reshapes the extracted known patches 504 to generate convolution filters 506. To match missing patches 508 with the known patches, the contextual attention layer 408 generates a measure of similarity. In the following discussion, the missing patches 508 are represented by the term $\{f_{x,y}\}$, and the extracted known patches 504 are represented by the term $\{b_{x,y}\}$. In one or more implementations, the contextual attention layer 408 generates this measurement of similarity with a normalized inner product (e.g., cosine similarity) according to the following:

$$s_{x,y,x',y'} = \left\langle \frac{f_{x,y}}{\|f_{x,y}\|}, \frac{b_{x',y'}}{\|b_{x',y'}\|} \right\rangle$$

Here, the term $s_{x,y,x',y'}$ represents similarity of a patch centered in the extracted known patches (x',y') and the missing patches (x,y). The contextual attention layer 408 weights the generated measurement of similarity. The contextual attention layer 408 weights the similarity with scaled softmax, for instance, along the x'y'-dimension. By weighting the generated measurement of similarity, the contextual attention layer 408 generates an attention score for each pixel. This is effective to produce a collection 510 of attention scores for the pixels. In one or more implementations, the contextual attention layer 408 generates attention score $s^*_{x,y,x',y'}$ for each pixel according to the following:

$$s^*_{x,y,x',y'} = \text{softmax}_{x',y'}(\lambda s_{x,y,x',y'})$$

Here, the term $\lambda$ represents a constant value. In accordance with the described techniques, the described system may implement the attention score generation as convolution and channel-wise softmax. Once the attention scores are generated, the contextual attention layer 408 uses the extracted known patches $\{b_{x,y}\}$ as deconvolutional filters to reconstruct the missing patches 508. The contextual attention layer 408 carries this out, in part, by averaging values of overlapped pixels.

In addition to the just described matching, the contextual attention layer 408 propagates the collection 510 of attention scores. In general, this propagation is effective to improve coherency of attention, such that the content generated for the pixels missing content is coherent with the content of the pixels with known content. One assumption related to coherency is that a shift in a missing patch likely corresponds to an equal shift in an extracted known patch for attention. By way of example, a first attention score $s^*_{x,y,x',y'}$ usually has a close value to a second attention score $s^*_{x+1,y,x'+1,y'}$ of a neighboring pixel. To model and encourage such coherency, for instance, the contextual attention layer 408 may propagate the attention scores by performing left-right propagation followed by top-down propagation with kernel size k. Consider one example, in which the contextual attention layer 408 performs left-right propagation according to the following equation:

$$\hat{s}_{x,y,x',y'} = \sum_{i \in \{-k,\ldots,k\}} s^*_{x+i,y,x'+i,y'}$$

Here, the term $\hat{s}_{x,y,x',y'}$ represents the left-right propagation of an attention score. In accordance with the described techniques, the described system may implement the attention propagation as convolution identity with identity matrix as kernels. In operation, the addition of attention propagation to the contextual attention layer 408 improves semantic reasonableness and visual pleasantness of the hole filling content generated by the trained machine-learning model 208. In training, this addition of the attention propagation enriches gradients.

Returning now to a further discussion of the dual-pathway framework 402, in accordance with one or more implementations. The training manager module 128 provides output of the first encoder 404 (e.g., a proposed refined fill generated using convolution) and the second encoder 406 (e.g., a proposed refined fill based on patch matching) to aggregation module 410. The training manager module 128 provides the aggregation of these outputs, as produced by the aggregation module 410, to a single decoder 412, which outputs the filled image 312 having the refined fill 314.

The illustrated example 400 also includes attention map 414 and attention map color coding 416. The attention map 414 represents a visualization indicative of which pixels of the intermediate image 310 are mapped to the refined fill 314 to generate the filled image 312. In particular, the attention map 414 is indicative of this mapping using color, namely, colors of the attention map color coding 416. In one or more implementations, for instance, the attention map color coding 416 is white at the center, pink on the bottom-left, and green on the top right. Based on this, a pixel of the attention map 414 that is white indicates that the pixel attends on itself (the pixel value is not changed), a pixel of the attention map 414 that is pink indicates information is borrowed from a bottom-left pixel of the intermediate image 310, and a pixel of the attention map 414 that is green indicates that information is borrowed from a top right pixel of the intermediate image 310.

Having discussed example details of the techniques for digital image completion by learning generation and patch matching jointly, consider now some example procedures to illustrate additional aspects of the techniques.

Example Procedures

This section describes example procedures for digital image completion by learning generation and patch matching jointly in a digital medium environment in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations, the procedures are performed by a suitably configured device, such as the client device 104 of FIG. 1 that makes use of an image completer 116 or image completer generation system 106 that makes use of the training manager module 128.

Figure 6:
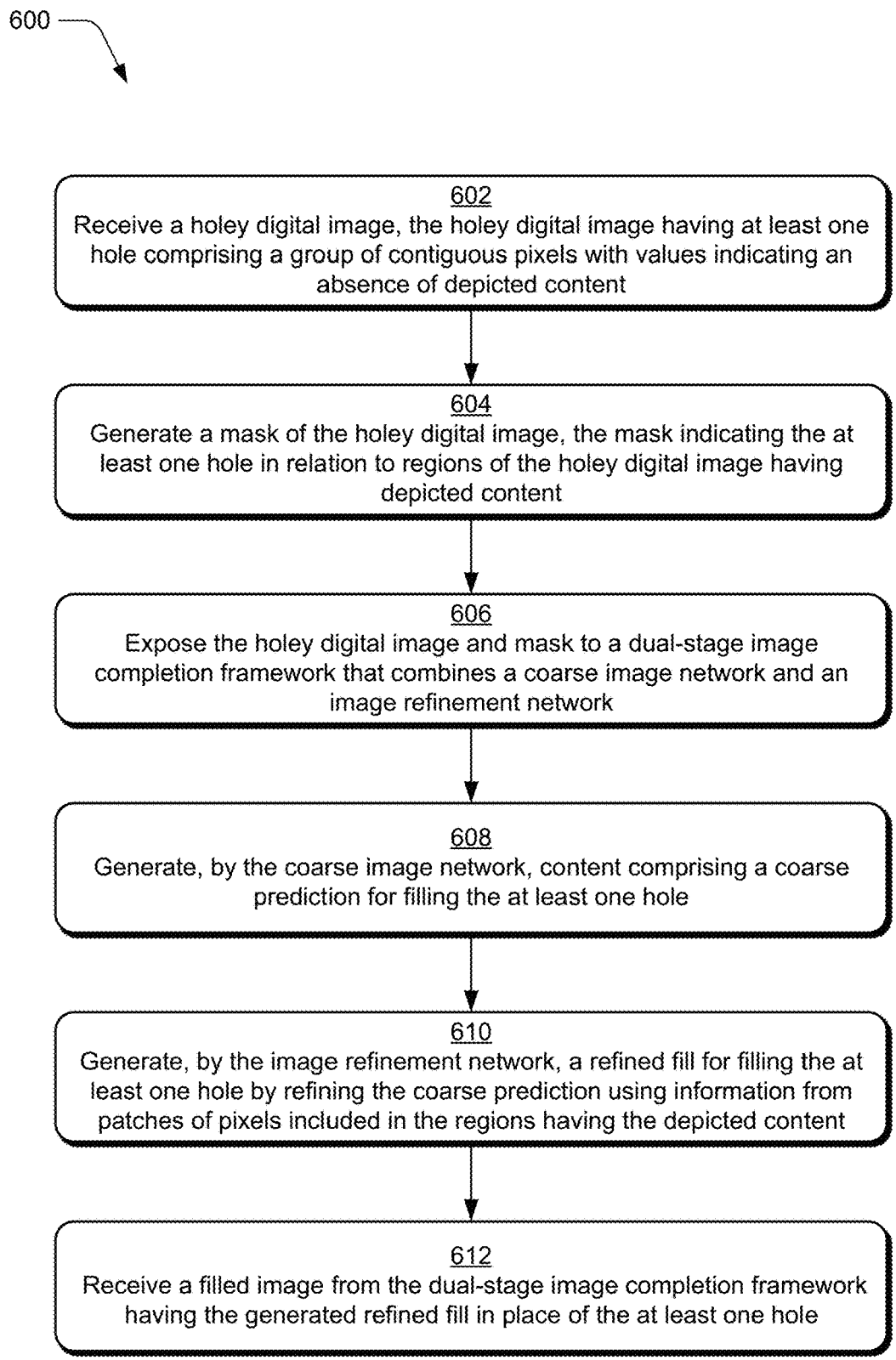
FIG. 6 depicts a procedure in an example implementation in which holes of a holey digital image are filled with image content generated using a machine-learning model trained with a dual-stage framework having coarse-filling and refinement stages.

FIG. 6 depicts an example procedure 600 in which holes of a holey digital image are filled with image content generated using a machine-learning model trained with a dual-stage framework having coarse-filling and refinement stages.

A holey digital image is received (block 602). In accordance with the principles discussed herein, the holey digital image includes at least one hole comprising a set of contiguous pixels with a set of values indicating an absence of depicted content. By way of example, the image completer 116 obtains the holey image 120 having the hole 122, which comprises a set of contiguous pixels with a set of values that indicate an absence of depicted content. Indeed, the hole 122 is depicted as white pixels whereas the rest of the holey image 120 is depicted comprising photo-realistic imagery.

A mask of the holey digital image is generated (block 604). In accordance with the principles discussed herein, the mask indicates the at least one hole in relation to regions of the holey digital image that have imagery. By way of example, the hole mask module 204 generates the hole mask 206 from the holey image 120. In this scenario, the hole mask 206 is indicative of the hole 122 of the holey image 120.

The holey digital image is exposed to a dual-stage image completion framework that combines a coarse image network and an image refinement network (block 606). In accordance with the principles discussed herein, the coarse image network and the image refinement network are combined based on training that leverages image reconstruction loss and generative adversarial network (GAN) losses. By way of example, the image completer 116 exposes the holey image 120 along with the mask generated at block 604 to an image completion framework that combines the coarse image network 134 and the image refinement network 136. These networks can be combined by the training manager module 128 as depicted in the illustrated example 300. As part of combining these networks, the training manager module 128 trains the coarse image network 134 using image reconstruction loss and trains the image refinement network 136 using image reconstruction loss as well as GAN losses.

A coarse prediction of content for filling the at least one hole is generated by the coarse image network (block 608). By way of example, the coarse image network 134 of the image completer 116 generates a coarse prediction for filling the hole 122 of the holey image 120. An example of such coarse prediction generation is generation of the coarse prediction 308, which is combined, with the portions of the training image 302 that are not removed, to form the intermediate image 310. In this example, though, the coarse image network 134 generates a coarse prediction for the holey image 120.

A refined fill for filling the at least one hole is generated by the image refinement network (block 610). In accordance with the principles discussed herein, the refined fill is generated by refining the coarse prediction using information from patches of pixels included in the regions of the holey digital image having the depicted content. By way of example, the image refinement network 136 of the image completer 116 generates a refined fill for filling the hole 122 of the holey image 120. In particular, the image refinement network 136 generates this refined fill by refining the coarse prediction generated at block 608. Additionally, the image refinement network 136 refines this coarse prediction using information extracted from patches included in the photo-realistic imagery of the holey image 120.

A filled image is received from the dual-stage image completion framework (block 612). In accordance with the principles discussed herein, the filled image includes the generated refined fill in place of the at least one hole. By way of example, the image completer 116 outputs the filled digital image 124, which has the network-generated content 126 to replace the hole 122. The filled digital image 124 is output from the image completer 116 without post-processing the filled digital image 124 as output by the dual-stage image completion framework. In this way, the dual-stage image completion framework may be considered end-to-end fully convolutional.

Figure 7A:
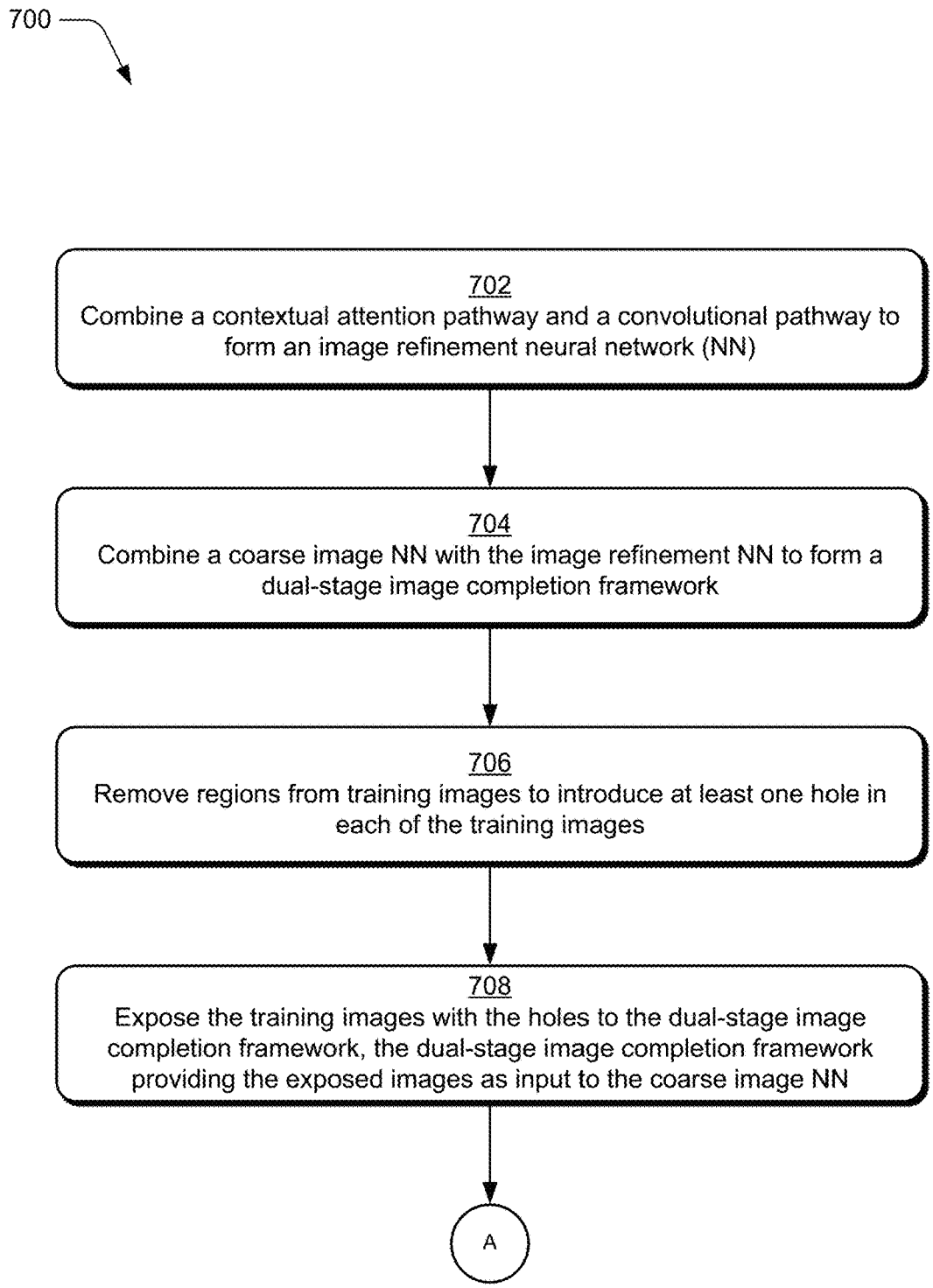
FIGS. 7A and 7B depicts a procedure in an example implementation in which a dual-stage framework is generated to fill holes of holey digital images with boundary consistent, semantically reasonable, and visually pleasant digital content.
Figure 7B:
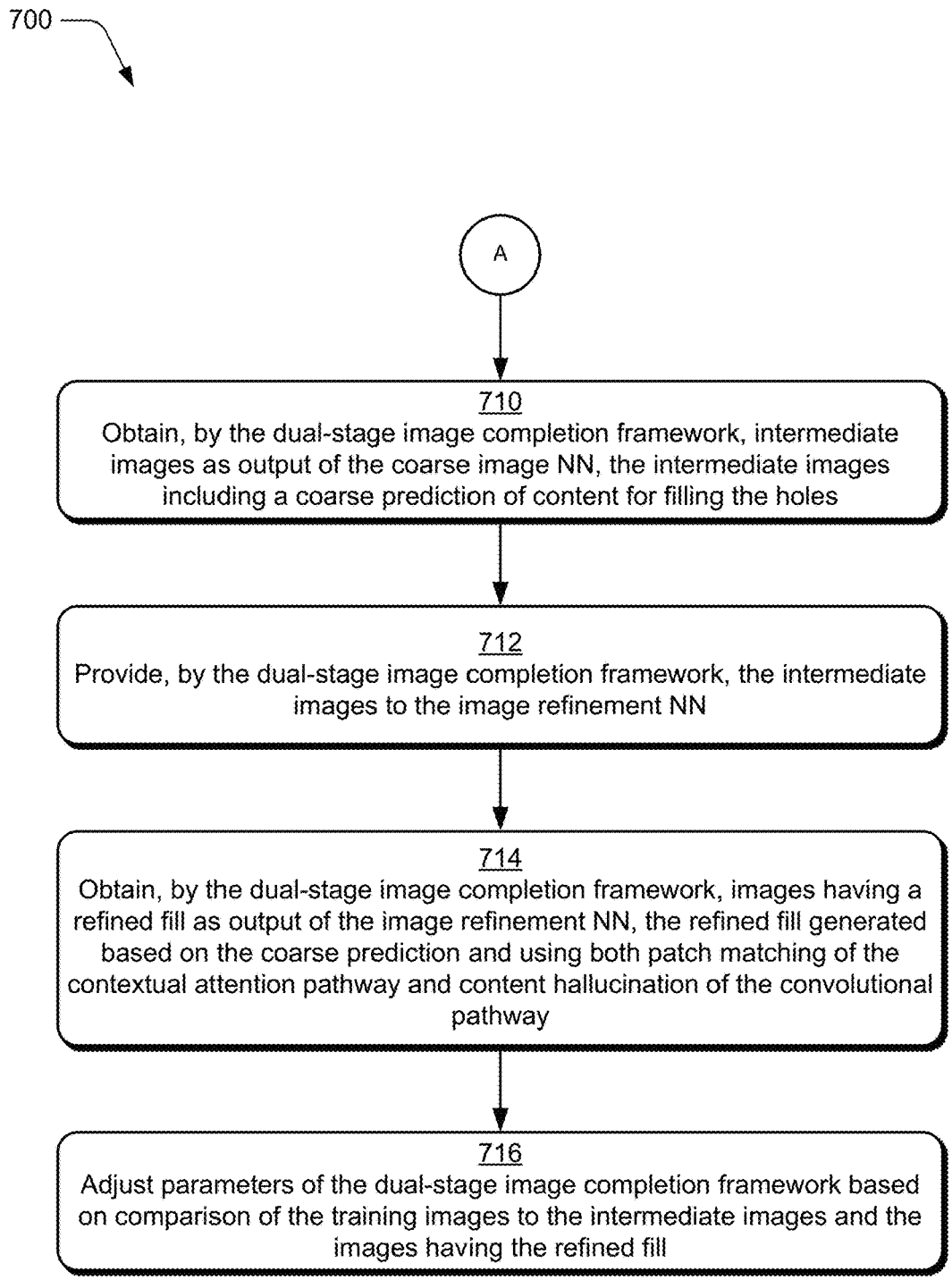

FIGS. 7A and 7B depict an example procedure 700 in which a dual-stage framework is generated to fill holes of holey digital images with boundary consistent, semantically reasonable, and visually pleasant digital content.

A contextual attention pathway and a convolutional pathway are combined to form an image refinement neural network (block 702). By way of example, the training manager module 128 combines the first encoder 404 (e.g., a contextual attention pathway) and the second encoder 406 (e.g., a convolutional pathway) to form the image refinement network 136 according to the dual-pathway framework 402.

A coarse image neural network is combined with the image refinement neural network to form a dual-stage image completion framework (block 704). By way of example, the training manager module 128 combines the coarse image network 134 with the image refinement network 136, where the image refinement network 136 is configured as described in relation to block 702 and in more detail in relation to FIG. 4. By combining the coarse image network 134 and the image refinement network 136 in this way, the training manager module 128 forms the dual-stage image completion framework for training.

Regions are removed from training images to introduce at least one hole in each of the training images (block 706). By way of example, the training manager module 128 removes regions from each image of one or more sets of training images. In one or more implementations, the training manager module 128 removes multiple regions from at least one image. In one or more implementations, each set of training images corresponds to an image type, where the types of images include, by way of example and not limitation, images of people, natural images, and patterned images.

The training images with the holes are exposed to the dual-stage image completion framework (block 708). In accordance with the principles discussed herein, the dual-stage image completion framework provides the exposed images as input to the coarse image neural network. By way of example, the training manager module 128 exposes the training images with the regions removed at block 706 to the dual-stage image completion framework of the illustrated example 300. In so doing, the training manager module 128 initiates training of this framework.

During training, the dual-stage framework learns to generate content for filling the holes removed from the training images. This learning is based, in part, on an activation function to activate the learning and also by learning weights for an overall objective function. In one or more implementations, the training manager module 128 activates the learning for the framework using exponential linear unit (ELU) activation functions rather than rectified linear unit (ReLU) activation functions. Further, the training manager module 128 trains the coarse image network 134 portion of the framework using reconstruction loss. In contrast, the training manager module 128 trains the image refinement network 136 portion of the framework using both reconstruction loss and modified Wasserstein Generative Adversarial Nets (WGAN) loss functions—as compared to simple GAN loss functions—as described in more detail above. In one or more implementations, the training manager module 128 includes mirror padding for each convolution layer, but not batch normalization layers. Additionally, the training manager module 128 configures the networks to clip output filter values rather than use tanh or sigmoid functions. The procedure 700 continues at 'A' from FIG. 7A to FIG. 7B.

Intermediate images are obtained by the dual-stage image completion framework as output from the coarse image neural network (block 710). In accordance with the principles discussed herein, these intermediate images include a coarse prediction of content for filling the holes. By way of example, the training manager module 128 obtains intermediate images as output of the coarse image network 134, such as intermediate image 310. These intermediate images include each include a coarse prediction (e.g., coarse prediction 308) generated by the coarse image network 134 for filling the holes introduced at block 706.

The intermediate images are provided by the dual-stage image completion framework as input to the image refinement neural network (block 712). By way of example, the training manager module 128 provides the intermediate images of block 710 as input to the image refinement network 136. Images having a refined fill are obtained by the dual-stage image completion framework as output from the image refinement neural network (block 714). In accordance with the principles discussed herein, the refined fill is generated by the image refinement neural network based on the coarse prediction. Further in accordance with the discussed principles, the refined fill is generated using both patch matching of the contextual attention pathway and content hallucination of the convolutional pathway. By way of example, the training manager module 128 obtains images having a refined fill as output of the image refinement network 136 as formed at block 702. The image refinement network 136 generates the refined fill of these images based on the coarse prediction of the intermediate images obtained at block 710. Additionally, the image refinement network 136 generates the refined fill using patch matching of the first encoder 404 (e.g., the contextual attention pathway of the dual-pathway framework 402) and also using content hallucination of the second encoder 406 (e.g., the convolutional pathway of the dual-pathway framework 402).

Parameters of the dual-stage image completion framework are adjusted based on comparison of the training images to the intermediate images output by the image refinement neural network and to the images having the refined fill output by the image refinement neural network (block 716). By way of example, the training manager module 128 initially compares the intermediate images obtained at block 710 to the training images (as configured prior to the region removal of block 706) based on reconstruction loss. The training manager module 128 also compares the refined-fill images obtained at block 714 to these training images (as configured prior to the region removal of block 706) based on both reconstruction loss and WGAN losses. Based on these comparisons, the training manager module 128 adjusts parameters of the framework, such as parameters of convolution layers or parameters of the contextual attention layer 408, e.g., of the contextual attention pathway. In this way, the framework learns to generate hole-filling content that is boundary consistent, semantically reasonable, and visually pleasant.

Having described example procedures in accordance with one or more implementations, consider now an example system and device that can be utilized to implement the various techniques described herein.

Example System and Device

Figure 8:
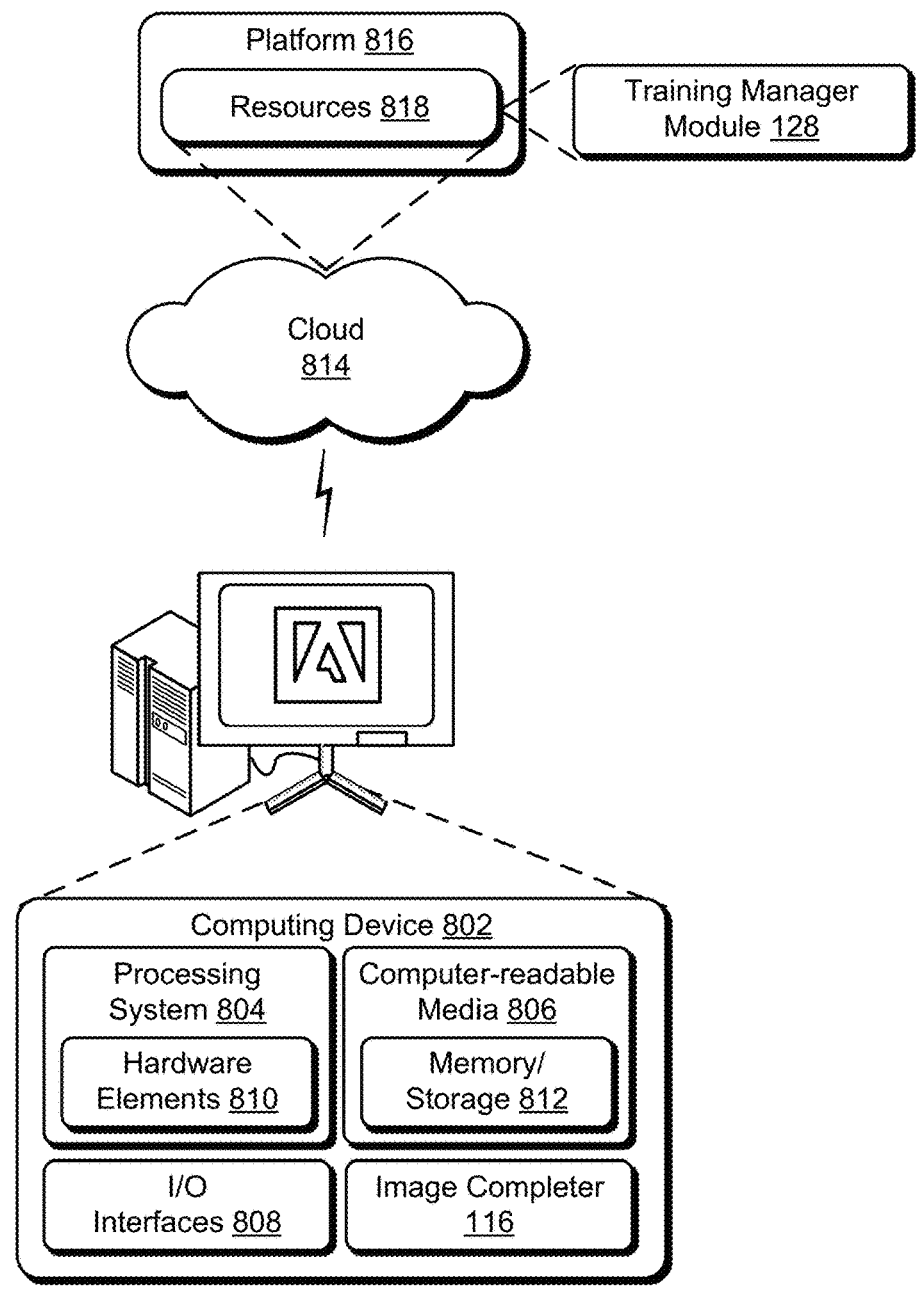
FIG. 8 illustrates an example system including various components of an example device that can be implemented as any type of computing device as described and/or utilized with reference to FIGS. 1-7B to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the image completer 116 and the training manager module 128. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors. [ooioi] An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to complete digital images having holes, a method implemented by at least one computing device, the method comprising:
exposing a holey digital image as input to a dual-stage image completion framework that combines a coarse image neural network and an image refinement neural network, the holey digital image having at least one hole comprising a set of pixels with a set of values indicating an absence of depicted imagery;
generating, by the coarse image neural network, content comprising a coarse prediction for filling the at least one hole;
generating, by the image refinement neural network, a refined fill for filling the at least one hole by refining the coarse prediction, the image refinement neural network refining the coarse prediction by copying information corresponding to patches of pixels included in the depicted imagery of the holey image based on a measure of similarity between the information corresponding to the patches of pixels included in the depicted imagery of the holey image and information corresponding to patches of pixels of the coarse prediction; and
receiving a filled digital image as output from the dual-stage image completion framework, the filled digital image including the refined fill in place of the at least one hole.

2. A method as described in claim 1, wherein the image refinement neural network includes:
a contextual attention pathway, the contextual attention pathway determining the information corresponding to the patches for the copying, in part, by determining the measure of similarity between the information corresponding to the patches of pixels included in the depicted imagery of the holey image and the information corresponding to the patches of pixels of the coarse prediction; and
a convolutional pathway, the convolutional pathway generating a proposed refined fill based on convolution of the coarse prediction.

3. A method as described in claim 2, further comprising forming the refined fill by combining the information corresponding to the patches determined for copying and the proposed refined fill.

4. A method as described in claim 1, wherein the coarse image neural network is trained based on reconstruction loss.

5. A method as described in claim 1, wherein the image refinement neural network is trained based on reconstruction loss and generative adversarial network (GAN) losses.

6. A method as described in claim 5, wherein the GAN losses are determined according to a Wasserstein GAN with gradient penalty (WGAN-GP) function.

7. A method as described in claim 1, wherein the coarse image neural network includes a convolutional neural network having mirror padding for each of a plurality of convolution layers and does not include a batch normalization layer.

8. A method as described in claim 1, wherein generating the coarse prediction includes the coarse image neural network clipping filter values output by an output layer of the coarse image neural network in lieu of using tanh or sigmoid functions.

9. A method as described in claim 1, wherein the image refinement neural network includes, in part, a convolutional neural network pathway including mirror padding for each of a plurality of convolution layers and does not include a batch normalization layer.

10. A method as described in claim 1, wherein generating the refined fill includes the image refinement neural network clipping filter values output by an output layer of the image refinement neural network in lieu of using tanh or sigmoid functions.

11. A method as described in claim 1, wherein the filled digital image is received as output from the dual-stage image completion framework without image post-processing operations being performed in relation to the filled digital image or the refined fill.

12. A method as described in claim 1, wherein the holey digital image has multiple holes.

13. A system comprising:
an image completer having a framework that combines a coarse image neural network and an image refinement neural network to output filled digital images from holey digital images received as input;
at least one processor; and
memory having stored thereon computer-readable instructions that are executable by the at least one processor to perform operations comprising:
exposing a holey digital image to the image completer, the holey digital image having at least one hole comprising a set of pixels with a set of values indicating an absence of depicted imagery; and
receiving a filled digital image from the image completer, the filled digital image including hole-filling digital imagery generated based on a coarse prediction of content for filling the hole that is produced by the coarse image neural network and a refinement of the coarse prediction that is produced by the image refinement neural network using patch matching, the image refinement neural network matches patches to produce the refinement by determining a measure of similarity between patches of pixels included in the coarse prediction and known patches of pixels included in the depicted imagery of the holey digital image.

14. A system as described in claim 13, wherein the image refinement neural network is further configured to match the patches to produce the refinement by copying information describing the known patches to similar patches of pixels included in the coarse prediction based on the measure of similarity.

15. A system as described in claim 13, wherein at least one of:
the coarse image neural network is configured as a convolutional neural network having a plurality of convolution layers that each include mirror padding;
the coarse image neural network does not include a batch normalization layer;

the coarse image neural network is activated to perform convolution operations for generating the coarse prediction using an exponential linear unit (ELU) activation function; or the coarse image neural network outputs the coarse prediction from an output layer by clipping output filter values and without using sigmoid or tanh at the output layer.

16. A system as described in claim 13, wherein the image refinement neural network is configured according to a dual-path framework that includes a contextual attention pathway and a convolutional pathway, the contextual attention pathway configured to match patches as part of producing the refinement, and the convolutional pathway configured to generate proposed content that is combined with the patch matching to produce the refinement.

17. In a digital medium environment to train a dual-stage image completion framework to complete digital images having holes, a method implemented by at least one computing device, the method comprising:
  combining, by the at least one computing device, a contextual attention pathway and a convolutional pathway to form an image refinement neural network;
  combining, by the at least one computing device, a coarse image neural network with the image refinement neural network to form the dual-stage image completion framework;
  removing, by the at least one computing device, regions from training images to introduce a hole in each of the training images;
  exposing, by the at least one computing device, the training images with the hole as input to the coarse image neural network;
  receiving, by the at least one computing device, intermediate images as output of the coarse image neural network, the intermediate images having a coarse prediction of imagery in place of the hole;
  providing, by the at least one computing device, the intermediate images with the coarse prediction as input to the image refinement neural network;
  receiving, by the at least one computing device, filled images as output of the image refinement neural network, the filled images having a refined fill in place of the hole that is generated by refining the coarse prediction, in part, using patch matching;
  comparing, by the at least one computing device, the training images to the intermediate images and the filled images; and
  adjusting, by the at least one computing device and based on the comparing, at least one of:
    parameters of the coarse image neural network used in operation to generate the coarse prediction; or
    parameters of the image refinement neural network used in operation to refine the coarse prediction to generate the refined fill.

18. A method as described in claim 17, wherein removing the regions from the training images includes randomly selecting a region of each training image to introduce a rectangular hole to the training image.

19. A method as described in claim 17, wherein:
  the training images are compared to the intermediate images using spatial reconstruction loss; and
  the training images are compared to the filled images using the spatial reconstruction loss and generative adversarial network (GAN) losses determined according to a Wasserstein GAN with gradient penalty (WGAN-GP) function.

20. A method as described in claim 17, further comprising performing the removing, exposing, receiving the intermediate images, providing, receiving the filled images, comparing, and adjusting for a plurality of sets of the training images.

* * * * *